United States Patent [19]

Endo et al.

[11] Patent Number: 5,557,448
[45] Date of Patent: Sep. 17, 1996

[54] OPTICAL SCANNER

[75] Inventors: Osamu Endo; Yoshinori Hayashi, both of Kawasaki, Japan

[73] Assignee: Ricoh Company, Ltd., Tokyo, Japan

[21] Appl. No.: 433,025

[22] Filed: May 3, 1995

[30] Foreign Application Priority Data

Jun. 28, 1994 [JP] Japan ..................... 6-146085

[51] Int. Cl.$^6$ ................................... G02B 26/08
[52] U.S. Cl. ................. 359/208; 359/205; 359/207
[58] Field of Search ..................... 359/205–208, 359/708, 711, 718, 216–219; 347/258–260

[56] References Cited

U.S. PATENT DOCUMENTS

| | | | |
|---|---|---|---|
| 5,157,534 | 10/1992 | Endou et al. | 359/212 |
| 5,233,454 | 8/1993 | Sakuma et al. | 359/196 |
| 5,408,095 | 4/1995 | Atsuumi et al. | 359/208 |
| 5,426,298 | 6/1995 | Sakuma et al. | 359/205 |

*Primary Examiner*—James Phan
*Attorney, Agent, or Firm*—Oblon, Spivak, McClelland, Maier & Neustadt, P.C.

[57] ABSTRACT

In an optical scanner, a light beam deflected by an optical deflector is reflected on a reflective image forming element and is converged as a light spot onto a scanned face through an elongated lens to perform an optical scanning operation. The reflective image forming element is formed by a plastic material and has a function for approximately converging the deflected light beam onto the scanned face with respect to a main scan-corresponding direction. The reflective image forming element also has a function for approximately moving the light spot at an equal speed. The elongated lens is formed by plastic and has a function for converging the deflected light beam onto the scanned face with respect to a cross scan-corresponding direction in cooperation with the reflective image forming element. The elongated lens also has negative refracting power with respect to the main scan-corresponding direction. In this optical scanner, the influence of a change in temperature on optical scanning characteristics can be reduced.

4 Claims, 3 Drawing Sheets

OPTICAL SCANNER

BACKGROUND OF THE INVENTION

1. Field of the Invention

The present invention relates to an optical scanner using a reflective image forming element.

2. Description of the Related Art

An optical scanner is known as a device for deflecting a light beam by an optical deflecting means such as a polygon mirror, etc. and converging the light beam as a light spot onto a scanned face by an image forming optical system such as an fθ lens, etc. to perform an optical scanning operation. As is well-known, the optical scanner is used in a writing section of each of an optical printer, a digital copying machine, etc.

Recently, a reflective image forming element having a concave mirror face is proposed and used as the image forming optical system or a portion thereof for converging the deflected light beam provided by the optical deflecting means as a light spot onto the scanned face. A reflective image forming element having a function for moving the light spot at an equal speed is also proposed. This function corresponds to the fθ function of an fθ lens.

When such a reflective image forming element is used, the reflective image forming element can be manufactured easily and cheaply in molding processing with respect to plastic.

However, since the reflective image forming element is formed by plastic, the reflective image forming element is easily influenced by temperature so that the optical scanning operation is influenced by a change in size of the reflective image forming element caused by a change in temperature. This influence greatly appears mainly as an error in magnification and a change in linearity of an image.

Recently, the mirror face is formed in an aspherical shape, etc. to improve optical performance of the reflective image forming element by correcting field curvature and linearity of the image. In this case, a toroidal lens, etc. is also used to perform the optical scanning operation with preferable accuracy. However, no optical scanner taking measures with respect to the above influence on temperature is known.

SUMMARY OF THE INVENTION

It is therefore an object of the present invention to provide a novel optical scanner in which the influence of a change in temperature on optical scanning characteristics can be effectively reduced in an optical scanning operation using a reflective image forming element formed by plastic.

The above object of the present invention can be achieved by an optical scanner in which a light beam deflected by optical deflecting means is reflected on a reflective image forming element and is converged as a light spot onto a scanned face through an elongated lens to perform an optical scanning operation.

The optical scanner is constructed such that the reflective image forming element is formed by a plastic material and has a function for approximately converging the deflected light beam onto the scanned face with respect to a main scan-corresponding direction and also has a function for approximately moving the light spot at an equal speed.

The elongated lens is formed by plastic and has a function for converging the deflected light beam onto the scanned face with respect to a cross scan-corresponding direction in cooperation with the reflective image forming element and also has negative refracting power with respect to the main scan-corresponding direction.

In this optical scanner, the influence of a change in temperature on optical scanning characteristics can be effectively reduced in an optical scanning operation using the reflective image forming element formed by plastic.

Further objects and advantages of the present invention will be apparent from the following description of the preferred embodiments of the present invention as illustrated in the accompanying drawings.

DESCRIPTION OF THE PREFERRED EMBODIMENTS

Figure 1:
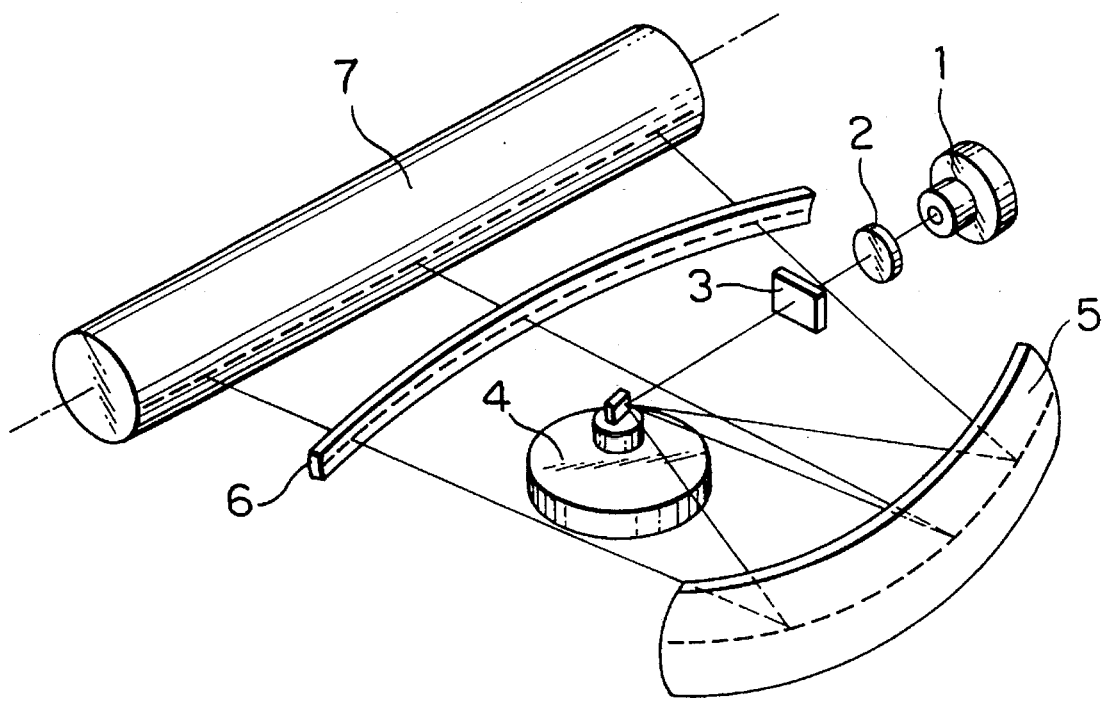
FIG. 1 is a view showing one example of the optical arrangement of an optical scanner to which the present invention can be applied.

The preferred embodiments of an optical scanner in the present invention will next be described in detail with reference to the accompanying drawings.

In an optical scanner of the present invention, a light beam deflected by optical deflecting means is reflected on a reflective image forming element and is converged as a light spot onto a scanned face through an elongated lens to perform an optical scanning operation.

Namely, the light beam from a light source side is deflected by the optical deflecting means such as a polygon mirror, etc. The light beam is then incident to the reflective image forming element and is reflected on this reflective image forming element. The reflected light beam is converged as a light spot onto the scanned face through the elongated lens so that the scanned face is optically scanned by this light beam.

The above optical scanner of the present invention has the following features as a first construction.

The reflective image forming element is formed by a plastic material and has a function for approximately converging the deflected light beam onto the scanned face with respect to a main scan-corresponding direction. The reflective image forming element also has a function for approximately moving the light spot at an equal speed.

The main scan-corresponding direction is set to a direction corresponding and parallel to a main scanning direction on a virtual optical path provided by linearly developing an optical path from a light source to the scanned face. A cross scan-corresponding direction is set to a direction corresponding and parallel to a cross scanning direction on this virtual optical path.

The elongated lens is formed by plastic and has a function for converging the deflected light beam onto the scanned face with respect to the cross scan-corresponding direction in cooperation with the reflective image forming element. The elongated lens also has negative refracting power with respect to the main scan-corresponding direction.

Namely, when the deflected light beam is seen in the main scan-corresponding direction, the deflected light beam is mainly converged onto the scanned face by an image forming action of the reflective image forming element. The elongated lens also has negative refracting power in the main scan-corresponding direction. Accordingly, the image forming action in the main scan-corresponding direction is also taken by the negative refracting power of the elongated lens. However, as mentioned above, the image forming action in the main scan-corresponding direction is mainly taken by the reflective image forming element and is supplementally taken by the elongated lens. Therefore, the reflective image forming element "approximately" converges the deflected light beam onto the scanned face with respect to the main scan-corresponding direction.

In contrast to this, with respect to the cross scan-corresponding direction, the deflected light beam is converged onto the scanned face by a combining image forming function of the reflective image forming element and the elongated lens composed of the image forming actions of the reflective image forming element and the elongated lens.

In the optical scanner having the above first construction, the elongated lens can be constructed by an elongated toroidal lens.

In this case, $r_{1m}/r_{2m}<1$ is set in a second construction of the present invention when $r_{1m}$ is a radius of curvature of an incident side lens face of the elongated toroidal lens with respect to the main scan-corresponding direction and $r_{2m}$ is a radius of curvature of an emitting side lens face of the elongated toroidal lens with respect to the main scan-corresponding direction. In the second construction, a reflecting face of the reflective image forming element is set to a coaxial aspherical surface and central curvature and aspherical coefficients of this coaxial aspherical surface can be optimized in accordance with optical characteristics of the elongated lens.

In a third construction of the present invention, an emitting side lens face of the elongated toroidal lens is set to a normal toroidal face having a radius $r_{2m}$ of curvature with respect to the main scan-corresponding direction. An incident side lens face of the elongated toroidal lens has an aspherical shape obtained by rotating a curve represented by the following formula $$x = y^2/[r + r\sqrt{\{1 - (1 + K)(y/r)^2\}}] + ay^4 + by^6 + cy^8 + dy^{10}$$

around an axis parallel to the main scan-corresponding direction. In this formula, r is central curvature, K is a conical constant, y is a distance from a center of the elongated toroidal lens in the main scan-corresponding direction and a, b, c and d are aspherical coefficients of higher orders. Large and small relations of the respective curvature radii are set to $r/r_{2m}<1$. In the third construction, a reflecting face of the reflective image forming element is set to a coaxial aspherical surface and central curvature and aspherical coefficients of this coaxial aspherical surface can be optimized in accordance with optical characteristics of the elongated toroidal lens.

In a fourth construction of the present invention, a $\alpha \leq \beta$ is desirably formed in each of the first to third constructions when $\alpha$ is a linear expansion coefficient of the plastic material of the reflective image forming element and $\beta$ is a linear expansion coefficient of the plastic material of the elongated lens. When the linear expansion coefficients $\alpha$ and $\beta$ are set to be equal to each other, each of $\alpha$ and $\beta$ can be set to $7.0 \times 10^{-5}$ (mm/° C.) in a fifth construction of the present invention. In a sixth construction of the present invention, $\alpha$ can be set to $5.0 \times 10^{-5}$ (mm/° C.) and $\beta$ can be set to $7.0 \times 10^{-5}$ (mm/° C.) when $\beta$ is set to be greater than $\alpha$.

When each of the reflective image forming element and the elongated lens is constructed by plastic, each of the reflective image forming element and the elongated lens tends to be expanded as a temperature of each of the reflective image forming element and the elongated lens is increased. Since the reflective image forming element has a concave reflecting face, the reflective image forming element reflects the deflected light beam in a direction approaching the optical axis of a lens system with respect to the main scan-corresponding direction. However, curvature of this reflecting face is reduced as the reflective image forming element is expanded in accordance with the rise in temperature. Accordingly, a function for reflecting the deflected light beam in the direction approaching the optical axis is reduced by this reduction in curvature.

The elongated lens has negative refracting power in the main scan-corresponding direction. Accordingly, in a lens converging action of the elongated lens in the main scan-corresponding direction, the light beam is not emitted from the elongated lens in an incident direction, but is directed onto a side separating from the optical axis.

When the elongated lens is expanded by the rise in temperature, a radius of curvature of the elongated lens in the main scan-corresponding direction is increased. The refractive index of plastic generally tends to be reduced as the temperature of plastic is increased. Accordingly, the negative refracting power of the elongated lens in the main scan-corresponding direction tends to be weakened in accordance with the rise in temperature by the above increase in curvature radius and the above reduction in refractive index.

Accordingly, when the function of the reflective image forming element for reflecting the deflected light beam in a direction approaching the optical axis is reduced in accordance with the rise in temperature, the function of the elongated lens for directing the emitted light beam from the incident direction onto a side separating from the optical axis is also reduced. Therefore, changes in both the functions tend to be canceled with each other. When the temperature of each of the reflective image forming element and the elongated lens is reduced, both the reflective image forming element and the elongated lens shrink so that the above functions are strengthened, but changes in these functions at this time tend to be also canceled with each other.

However, the function of the reflective image forming element is fulfilled by reflection and the function of the elongated lens is fulfilled by refraction. Therefore, these functions tend to be greatly changed by the change in temperature on a side of the reflective image forming element on which an angle of reflection is greatly changed.

In the present invention, a $\alpha \leq \beta$ is set in consideration of such points when $\alpha$ is a linear expansion coefficient of the plastic material of the reflective image forming element and $\beta$ is a linear expansion coefficient of the plastic material of the elongated lens. Accordingly, the changes in functions of the reflective image forming element and the elongated lens caused by the change in temperature can be more effectively canceled.

FIG. 1 schematically shows only a main portion of an optical scanner in accordance with one embodiment of the present invention.

In FIG. 1, a divergent laser beam is emitted from a laser light source 1 and is converged by a lens 2. The laser beam is changed to a parallel light beam, a convergent light beam or a divergent light beam in accordance with an extent of the convergence provided by the lens 2. This light beam is converged only in a cross scan-corresponding direction by a cylindrical lens and is focused and formed as a linear image extending in a main scan-corresponding direction.

A tenon type mirror 4 as an optical deflecting means has a deflecting reflecting face in the vicinity of a forming position of the above linear image. The tenon type mirror 4 deflects the light beam at an equal angular velocity while the light beam is reflected on the tenon type mirror 4.

The optical deflecting means can also be constructed by using a polygon mirror, a galvano mirror, a pyramidal mirror, etc.

The light beam is changed to a deflected light beam by the tenon type mirror 4 and is incident to the reflective image forming element 5. This light beam is then reflected on the reflective image forming element 5 and is converged as a light spot onto a scanned face through an elongated lens 6. A photosensitive body 7 having a drum shape is arranged such that a generating line of the photosensitive body 7 comes in contact with the scanned face. The light spot is converged on a circumferential face of the photosensitive body 7. Thus, the photosensitive body 7 is optically scanned by this light spot.

The tenon type mirror 4 reflects the deflected light beam in a slanting upward direction with respect to a face perpendicular to a rotational axis of the deflecting reflecting face. The reflective image forming element 5 is arranged such that the reflective image forming element 5 is shifted upward in a direction of the above rotational axis. The reflective image forming element 5 separates the incident and reflected light beams from each other in the rotational axis direction. Accordingly, an optical path of the light beam incident to the reflective image forming element 5 is separated from an optical path of the reflected light beam in the cross scan-corresponding direction. Therefore, no light beam reflected on the reflective image forming element 5 is returned to the deflecting reflecting face of the tenon type mirror 4.

The elongated lens 6 is shifted in a cross scanning direction and is arranged in a position in which the elongated lens 6 is rotated around an axis parallel to the main scan-corresponding direction. Accordingly, the elongated lens 6 effectively corrects a curve in a scanning line as a locus of the light spot on the scanned face.

The shape of a reflecting face of the reflective image forming element 5 is formed as a coaxial aspherical surface and is provided by the following well-known aspherical formula.

$$X = Y^2/[R + R\sqrt{1 - (1 + K)(Y/R)^2}X] + AY^4 + BY^6 + CY^8 + DY^{10}$$

In this formula, X is a coordinate in an optical axis direction when an intersecting point of an optical axis and the reflecting face is set to an origin. Y is a distance from the optical axis. R is a radius of curvature of the reflecting face on the optical axis. K is a conical constant. A, B, C and D are aspherical coefficients of higher orders with respect to the reflecting face. The conical constant K and the higher order aspherical coefficients A to D are called aspherical coefficients as a whole.

Concrete Example 1

A first concrete example 1 is an embodiment relating to each of first, second, fourth and fifth constructions of the present invention. In the construction of the optical scanner shown in FIG. 1, the elongated lens 6 is constructed by an elongated toroidal lens. $r_{1m}$ is set to a radius of curvature of a toroidal lens face on an incident side with respect to the main scan-corresponding direction. $r_{2m}$ is set to a radius of curvature of a toroidal lens face on an emitting side with respect to the main scan-corresponding direction. In this case, $r_{1m}/r_{2m} < 1$ is formed. Central curvature R and the aspherical coefficients K, A, B, C and D of the reflecting face of the reflective image forming element ape optimized in accordance with optical characteristics of the elongated toroidal lens.

The reflective image forming element and the elongated toroidal lens are formed by the same plastic material having a linear expansion coefficient of $7.0 \times 10^{-5}$ mm/° C.

In each of the following concrete examples, the curvature radius of a lens face, etc. are set to be positive (+) in a direction from the tenon type mirror 4 to the reflective image forming element 5 in FIG. 1. E and a number subsequent to this E show power in notation of the higher order aspherical coefficients A to D among the aspherical coefficients K and A to D. For example, "E-10" means $10^{-10}$ and this power is multiplied by a numeric value before this power.

The above values R, K, A, B, C and D specifying the reflecting face shape of the reflective image forming element are set as follows.

$R = -370.4, K = -1.5767, A = 5.757E - 10,$
$B = -7.54E - 14, C = 1.67E - 18, D = -7.69E - 23$

A distance $D_0$ from the deflecting reflecting face of the tenon type mirror 4 to the reflective image forming element 5 is set to be equal to 115.3 when an image height is equal to zero.

The incident side lens face and the emitting side lens face of the elongated toroidal lens respectively have curvature radii $r_{1m}$ and $r_{2m}$ with respect to the main scan-corresponding direction and respectively have curvature radii $r_{1s}$ and $r_{2s}$ with respect to the cross scan-corresponding direction. These curvature radii are set as follows.

$r_{1m} = 700, r_{2m} = 780, r_{1s} = 57.3, r_{2s} = 25.1$

A thickness $d_0$ of the elongated toroidal lens on the optical axis is set to −3. A refractive index of the elongated toroidal lens is set to 1.572.

A distance $D_1$ from the reflective image forming element to the elongated toroidal lens is set to −118.3 when the image height is equal to zero. A distance $D_2$ from the elongated toroidal lens to the scanned face is set to −93 when the image height is equal to zero, The reflective image forming element and the elongated toroidal lens are designed such that the designing value of a using temperature is equal to 20° C. The above data are provided at the using temperature on design.

When the using temperature is equal to 10° C. and 55° C., the above data are respectively provided as follows.

10° C.:
$R = -370.44051, K = -1.5767, A = 5.769E - 10,$
$B = -7.57E - 14, C = 1.68E - 18, D = -7.74E - 23$
$r_{1m} = 699.5100, r_{2m} = 779.4540, r_{1s} = 57.2599,$
$r_{2s} = 25.0824, d_0 = -2.9979, n = 1.573$

55° C.:
R = –371.34809, K = –1.5767, A = 5.727E – 10,
B = –7.48E – 14, C = 1.65E – 18, D = –7.57E – 23
$r_{1m}$ = 701.7150, $r_{2m}$ = 781.9910, $r_{1s}$ = 57.4404,
$r_{2s}$ = 25.1615, $d_0$ = –3.00735, n = 1.568

Figure 2:
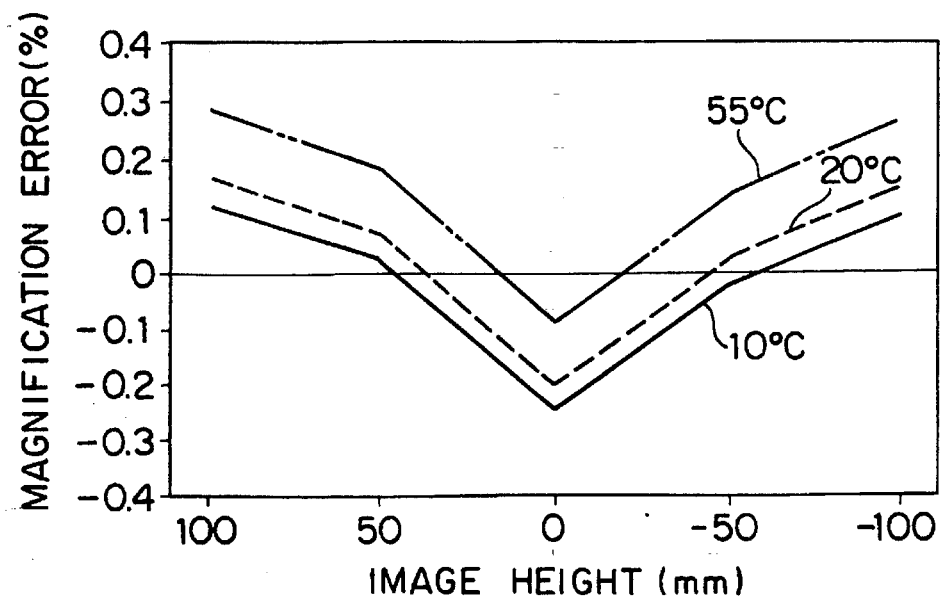
FIG. 2 is a view showing fluctuations of a magnification error caused by a change in temperature in a concrete example 1.

When the using temperature is equal to 20° C. (a designing value), 10° C. and 55° C., a magnification error is provided as shown in FIG. 2.

The magnification error is defined as follows.

$L_0$ is set to an ideal scanning width in an optical scanning operation. In a digital copying machine, this ideal scanning width corresponds to the width of an original. L is set to a real scanning width provided by the optical scanner. When these scanning widths $L_0$ and L are used, the magnification error is defined by the following amount.

$$\{(L-L_0)/L_0\} \times 100 \ (\%)$$

For example, when $L_0$ is equal to 100 mm, the magnification error is called a magnification error with respect to a width of 100 mm. The magnification error is a function of the image height M.

H is set to a real image height at a certain field angle θ. At this time, an ideal field angle providing the image height H is set to $θ_0$ when an optical system is ideally realized. Namely, when the ideal image height at the field angle $θ_0$ is set to $h(θ_0)$, $H=h(θ_0)$ is ideally formed in the optical system. However, in reality, the image height H is provided at the field angle θ.

Therefore, two field angles of $\{θ+(θ_0/2)\}$ and $\{θ-(θ_0/2)\}$ are considered in association with the field angle θ. The real image heights at these two field angles are respectively set to $H(θ+\{θ_0/2\})$ and $H(θ-\{θ_0/2\})$.

At this time, the magnification error at the field angle θ, i.e., the magnification error in a position of the image height H, is defined by the following formula.

$$[H(θ+\{θ_0/2\})-H(θ-\{θ_0/2\})]/h(θ_0)$$

FIG. 2 shows the magnification error as a function of the image height H with respect to a maximum scanning width of 100 mm.

Comparison Example 1

An elongated toroidal lens having positive refracting power is used in a comparison example to compare the above concrete example 1 and this comparison example 1 with each other.

Similar to the above concrete example 1, numeric data of the reflective image forming element and the elongated toroidal lens are provided as follows.

Reflective image forming element:
R = –374.5, K = –1.4737, A = 5.233E – 10,
B = –1.39E – 14, C = –1.53E – 18, D = –3.38E – 23
$D_0$ = 115.3
Elongated toroidal lens:
$r_{1m}$ = 7.830, $r_{2m}$ = 752.9, $r_{1s}$ = 57.3, $r_{2s}$ = 25.1
$d_0$ = 3, n = 1.572
$D_1$ = –118.3, $D_2$ = –97

The reflective image forming element and the elongated toroidal lens are designed such that the designing value of a using temperature is equal to 20° C. The above data are provided at the using temperature on design.

When the using temperature is equal to 10° C. and 55° C., the above data are respectively provided as follows.

10° C.:
R = –374.238, K = –1.4737, A = 5.244E – 10,
B = –1.39E – 14, C = –1.54E – 18, D = –3.40E – 23
$r_{1m}$ = 782.4520, $r_{2m}$ = 742.3730, $r_{1s}$ = 57.2599,
$r_{2s}$ = 25.18236, $d_0$ = 2.9979, n = 1.573
55° C:
R = –375.418, K = –1.4737, A = 5.195E – 10,
B = –1.37E – 14, C = –1.50E – 18, D = –3.31E – 23
$r_{1m}$ = 784.9184, $r_{2m}$ = 754.7446, $r_{1s}$ = 57.4404,
$r_{2s}$ = 25.2617, $d_0$ = –3.00735, n = 1.568

Figure 3:
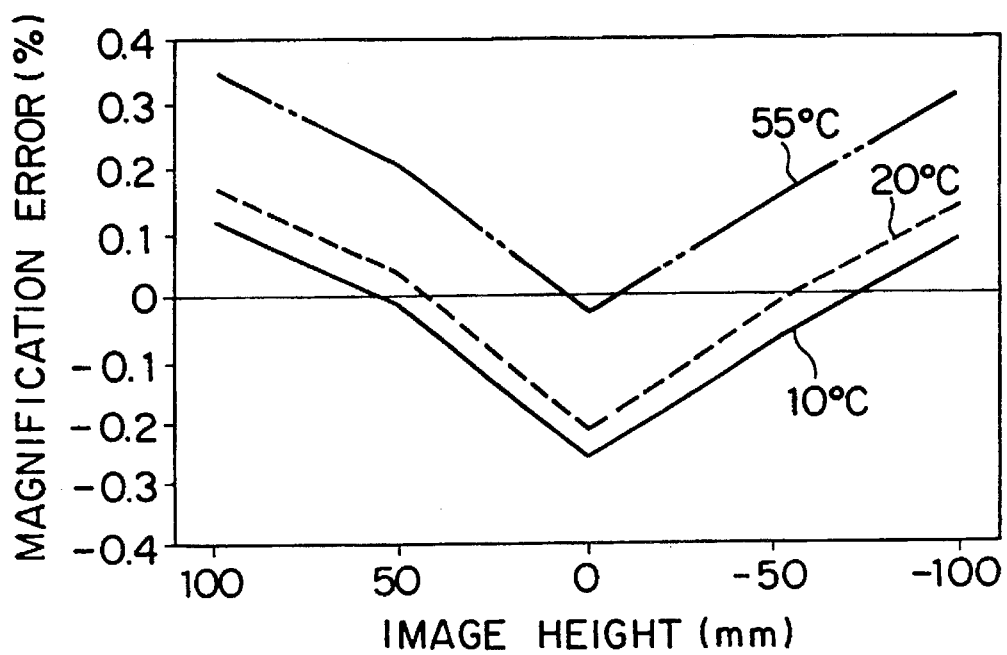
FIG. 3 is a view showing fluctuations of a magnification error caused by a change in temperature in a comparison example 1.

When the using temperature is (a designing value), 10° C. and 55° C., a magnification error with respect to a width of 100 mm is provided as shown in FIG. 3. It should be understood from comparison of FIGS. 2 and 3 that fluctuations of the magnification error caused by a change in temperature in the concrete example 1 as an embodiment relating to each of the first, second, fourth and fifth constructions of the present invention are small in comparison with the comparison example 1.

Concrete Example 2

The following concrete example 2 is one embodiment relating to each of first, third, fourth and fifth constructions of the present invention.

In the concrete example 2, the elongated lens 6 is constructed by an elongated toroidal lens in the construction of the optical scanner shown in FIG. 1. An emitting side lens face of this elongated toroidal lens is set to a normal toroidal face having a curvature radius $r_{2m}$ with respect to the main scan-corresponding direction. An incident side lens face of the elongated toroidal lens is set to an aspherical surface obtained by rotating a curve represented by the following formula around an axis parallel to the main scan-corresponding direction.

$$x = y^2/[r + r\sqrt{1 - (1 + K)(y/r)^2}] + ay^4 + by^6 + cy^8 + dy^{10}$$

This formula uses central curvature r, a conical constant k, a distance y from a center of the toroidal lens in the main scan-corresponding direction and aspherical coefficients a, b, c and d of higher orders.

Large and small relations of the above curvature radii are determined such that $r/r_{2m} < 1$ is formed. A reflecting face of the reflective image forming element is set to a coaxial aspherical surface. Central curvature and aspherical coefficients of this coaxial aspherical surface are optimized in accordance with optical characteristics of the elongated toroidal lens.

Similar to the concrete example 1, numeric data with respect to the reflective image forming element are provided as follows.

Reflective image forming element:
R = –370.4, K = –1.5767, A = 5.757E – 10,
B = –7.54E – 14, C = 1.67E – 18, D = –7.69E – 23
$D_0$ = 115.3

Numeric data with respect to the elongated toroidal lens are provided as follows.

Elongated toroidal lens:
Incident side lens face;
$r_{1m}$ = r = 700, k = –1.384, a = –3.629E – 9,
b = 1.679E – 13, c = –5.361E – 18,
d = 1.919E – 22, $r_{1s}$ = 57.3
Emitting side lens face; $r_{2m}$ = 780, $r_{2s}$ = 25.1
$d_0$ = –3, n = 1,572, $D_1$ = –118.3, $D_2$ = –93

The reflective image forming element and the elongated toroidal lens are designed such that the designing value of a using temperature is equal to 20° C. The above data are provided at the using temperature on design.

When the using temperature is equal to 10° C. and 55° C., the above data are respectively provided as follows.

10° C.:
$R = -370.44051, K = -1.5767, A = 5.769E - 10,$
$B = -7.57E - 14, C = 1.68E - 18, D = -7.74E - 23$
$r_{1m} = r = 699.51, k = -1.384, a = -3.64E - 9,$
$b = 1.685E - 13, c = -5.39E - 18, d = 1.931E - 22$
$r_{1s} = 57.2599, r_{2m} = 779.4540, r_{2s} = 25.0824$
$d_0 = 2.998, n = 1.573$
55° C:
$R = -371.34809, K = -1.5767, A = 5.727E - 10,$
$B = -7.48E - 14, C = 1.65E - 18, D = -7.57E - 23$
$r_{1m} = r = 701.72, k = -1.384, a = -3.60E - 9,$
$b = 1.659E - 13, c = -5.27E - 18, d = 1.877E - 22$
$r_{1s} = 57.4404, r_{2m} = 781.9110, r_{2s} = 25.1615$
$d_0 = -3.007, n = 1.568$

Figure 4:
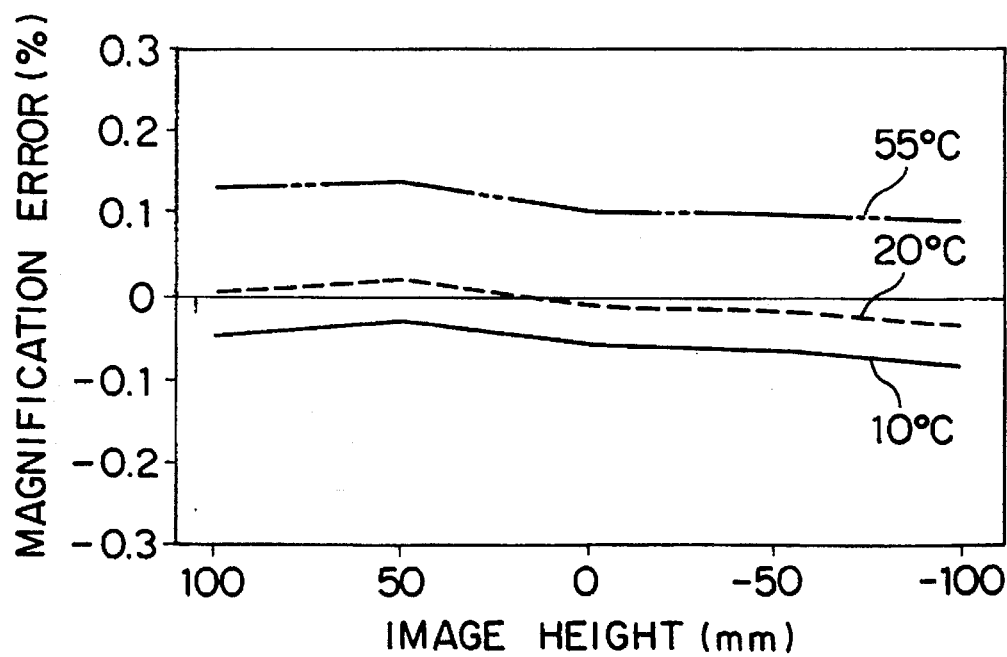
FIG. 4 is a view showing fluctuations of a magnification error caused by a change in temperature in a concrete example 2.

When the using temperature is equal to 20° C. (a designing value), 10° C. and 55° C., a magnification error is provided as shown in FIG. 4.

Comparison Example 2

Similar to the concrete example 2, an incident side lens face of the elongated toroidal lens is set to an aspherical surface and the elongated toroidal lens has positive refracting power in the main scan-corresponding direction in a comparison example 2 to compare the concrete example 2 and this comparison example 2 with each other.

Similar to the above concrete example 1, numeric data of the reflective image forming element and the elongated toroidal lens are provided as follows.

Reflective image forming element:
$R = -374.5, K = -1.4737, A = 5.233E - 10,$
$B = -1.39E - 14, C = -1.53E - 18, D = -3.38E - 23$
$D_0 = 115.3$ This reflective image forming element is equal to the reflective image forming element in the above comparison example 1.

Numeric data with respect to the elongated toroidal lens are provided as follows.

Elongated toroidal lens:
Incident side lens face;
$r_{1m} = r = 783.0, k = -1.578, a = -2.28E - 10,$
$b = 6.845E - 15, c = 2.077E - 18, d = 6.162E - 23$
$r_{1s} = 57.3$ Emitting side lens face;
$r_{2m} = 752.9, r_{2s} = 25.1$
$d_0 = -3, n = 1.572, D_1 = -118.3, D_2 = -97$ The reflective image forming element and the elongated toroidal lens are designed such that the designing value of a using temperature is equal to 20° C. The above data are provided at the using temperature on design.

Figure 5:
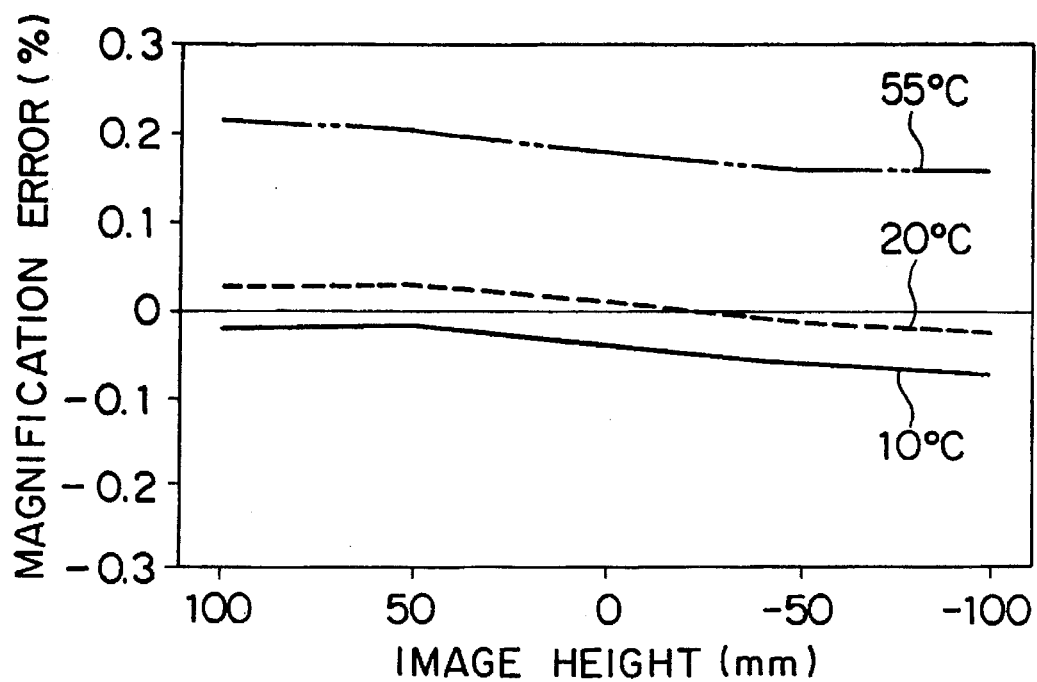
FIG. 5 is a view showing fluctuations of a magnification error caused by a change in temperature in a comparison example 2.

When the using temperature is equal to 20° C., 10° C. and 55° C., a magnification error with respect to a width of 100 mm in the comparison example 2 is provided as shown in FIG. 5.

It should be understood from comparison of FIGS. 4 and 5 that fluctuations of the magnification error caused by a change in temperature in the concrete example 1 as an embodiment relating to each of the first, third, fourth and fifth constructions of the present invention are small and reduced in comparison with the comparison example 2.

Concrete Example 3

The final concrete example 3 is one embodiment relating to each of first, third, fourth and sixth constructions of the present invention. In this concrete example 3, the elongated lens 6 is constructed by an elongated toroidal lens in the construction of the optical scanner shown in FIG. 1 and a reflecting face of the reflective image forming element is set to a coaxial aspherical surface. Aspherical coefficients of this coaxial aspherical surface are optimized in accordance with optical characteristics of the elongated toroidal lens.

The reflective image forming element has the same shape as the reflective image forming element in the above concrete example 2. However, the reflective image forming element in this concrete example 3 is formed by a plastic material having a linear expansion coefficient $\alpha$ of $5.0 \times 10^{-5}$ (mm/° C.). The elongated toroidal lens is equal to that in the concrete example 2.

The reflective image forming element and the elongated toroidal lens are designed such that the designing value of a using temperature is equal to 20° C. Numeric data at this time are completely equal to those at the using temperature of 20° C. in the concrete example 2.

When the using temperature is equal to 10° C. and 55° C., numeric data with respect to the reflective image forming element and the elongated toroidal lens are provided as follows.

10° C.:
$R = -370.51465, K = -1.5767, A = 5.766E - 10,$
$B = -7.56E - 14, C = 1.68E - 18, D = -7.72E - 23$
$r_{1m} = r = 699.51, k = -1.384, a = -3.64E - 9,$
$b = 1.685E - 13, c = -5.39E - 18, d = 1.931E - 22$
$r_{1s} = 57.2599, r_{2m} = 779.4540, r_{2s} = 25.0824$
$d_0 = -2.998, n = 1.573$

55° C.:
$R = -371.16305, K = -1.5767, A = 5.735E - 10,$
$B = -7.50E - 14, C = 1.66E - 18, D = -7.60E - 23$
$r_{1m} = r = 701.72, k = -1.384, a = -3.60E - 9,$
$b = 1.659E - 13, c = -5.27E - 18, d = 1.877E - 22$
$r_{1s} = 57.4404, r_{2m} = 781.9110, r_{2s} = 25.1615$
$d_0 = -3.007, n = 1.568$

When the using temperature is equal to 20° C. (a designing value), 10° C. and 55° C., a magnification error with respect to a width of 100 mm is provided as shown in FIG. 6.

Figure 6:
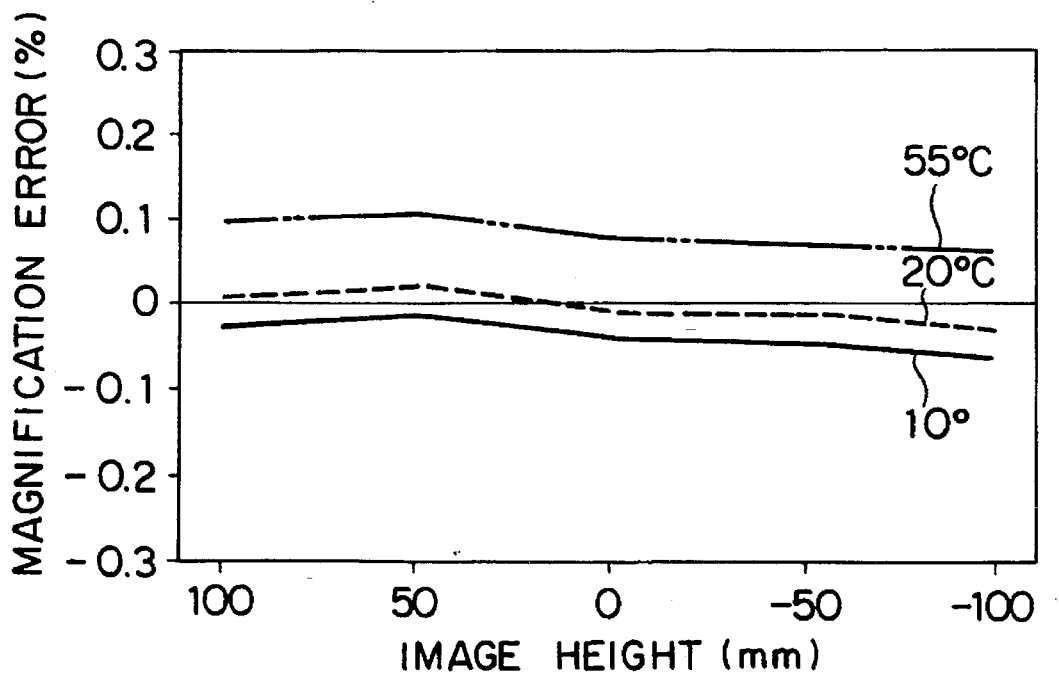
FIG. 6 is a view showing fluctuations of a magnification error caused by a change in temperature in a concrete example 3.

When FIG. 6 is compared with FIG. 4, it should be clearly understood that fluctuations of the magnification error caused by a change in temperature are further reduced and improved by reducing the linear expansion coefficient of the material of the reflective image forming element.

Accordingly, it is effective to select a material of the reflective image forming element having a linear expansion coefficient smaller than that of a material of the elongated lens when the fluctuations of scanning characteristics caused by a change in temperature are reduced. The material of the elongated lens is limited to a certain extent since there are conditions about a refractive index, etc. of this material. However, no refraction is used with respect to the reflective image forming element so that a degree of freedom with respect to the material of the reflective image forming element is large. Therefore, it is easy to select a material of the reflective image forming element having a linear expansion coefficient smaller than that of the elongated lens.

In the above description, an influence on the change in temperature is explained by using the magnification error. However, in each of the above concrete examples, it is confirmed that fluctuations of linearity of an image caused by the change in temperature can be also reduced effectively in comparison with the comparison examples, etc.

As mentioned above, in the novel optical scanner of the present invention constructed above, the fluctuations of scanning characteristics such as linearity, a magnification error, etc. caused by a change in temperature can be reduced by using the reflective image forming element and the elongated lens cheaply manufactured by a plastic material so that a preferable optical scanning operation can be performed.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner in which a light beam deflected by optical deflecting means is reflected on a reflective image forming element and is converged as a light spot onto a scanned face through an elongated lens to perform an optical scanning operation;

the optical scanner being constructed such that said reflective image forming element is formed by a plastic material and has a function for approximately converging the deflected light beam onto the scanned face with respect to a main scan-corresponding direction and also has a function for approximately moving said light spot at an equal speed;

said elongated lens is formed by plastic and has a function for converging the deflected light beam onto the scanned face with respect to a cross scan-corresponding direction in cooperation with said reflective image forming element and also has negative refracting power with respect to the main scan-corresponding direction.

2. An optical scanner in which a light beam deflected by optical deflecting means is reflected on a reflective image forming element and is converged as a light spot onto a scanned face through an elongated lens to perform an optical scanning operation;

the optical scanner being constructed such that said reflective image forming element is formed by a plastic material and has a function for approximately converging the deflected light beam onto the scanned face with respect to a main scan-corresponding direction and also has a function for approximately moving said light spot at an equal speed;

said elongated lens is formed by plastic and has a function for converging the deflected light beam onto the scanned face with respect to a cross scan-corresponding direction in cooperation with said reflective image forming element and also has negative refracting power with respect to the main scan-corresponding direction;

wherein the elongated lens is constructed by an elongated toroidal lens and $r_{1m}/r_{2m}<1$ is formed when $r_{1m}$ is a radius of curvature of an incident side lens face of the elongated toroidal lens with respect to the main scan-corresponding direction and $r_{2m}$ is a radius of curvature of an emitting side lens face of the elongated toroidal lens with respect to the main scan-corresponding direction;

a reflecting face of the reflective image forming element is set to a coaxial aspherical surface and central curvature and aspherical coefficients of this coaxial aspherical surface are optimized in accordance with optical characteristics of said elongated lens.

3. An optical scanner in which a light beam deflected by optical deflecting means is reflected on a reflective image forming element and is converged as a light spot onto a scanned face through an elongated lens to perform an optical scanning operation;

the optical scanner being constructed such that said reflective image forming element is formed by a plastic material and has a function for approximately converging the deflected light beam onto the scanned face with respect to a main scan-corresponding direction and also has a function for approximately moving said light spot at an equal speed;

said elongated lens is formed by plastic and has a function for converging the deflected light beam onto the scanned face with respect to a cross scan-corresponding direction in cooperation with said reflective image forming element and also has negative refracting power with respect to the main scan-corresponding direction;

wherein an emitting side lens face of the elongated lens is set to a normal toroidal face having a radius $r_{2m}$ of curvature with respect to the main scan-corresponding direction;

an incident side lens face of the elongated lens has an aspherical shape obtained by rotating a curve represented by the following formula $$x = y^2/[r + r\sqrt{1 - (1 + k)(y/r)^2}] + ay^4 + by^6 + cy^8 + dy^{10}$$

around an axis parallel to the main scan-corresponding direction when r is central curvature, k is a conical constant, y is a distance from a center of the elongated lens in the main scan-corresponding direction and a, b, c and d are aspherical coefficients of higher orders;

$r/r_{2m}<1$ is formed; and a reflecting face of the reflective image forming element is set to a coaxial aspherical surface and central curvature and aspherical coefficients of this coaxial aspherical surface are optimized in accordance with optical characteristics of said elongated lens.

4. An optical scanner as claimed in claim 1, 2 or 3, wherein $\alpha \leq \beta$ is formed when $\alpha$ is a linear expansion coefficient of the plastic material of the reflective image forming element and $\beta$ is a linear expansion coefficient of the plastic material of the elongated lens.

* * * * *